May 25, 1937. L. EMANUELI 2,081,880
HIGH TENSION ELECTRIC CABLE
Filed May 22, 1929
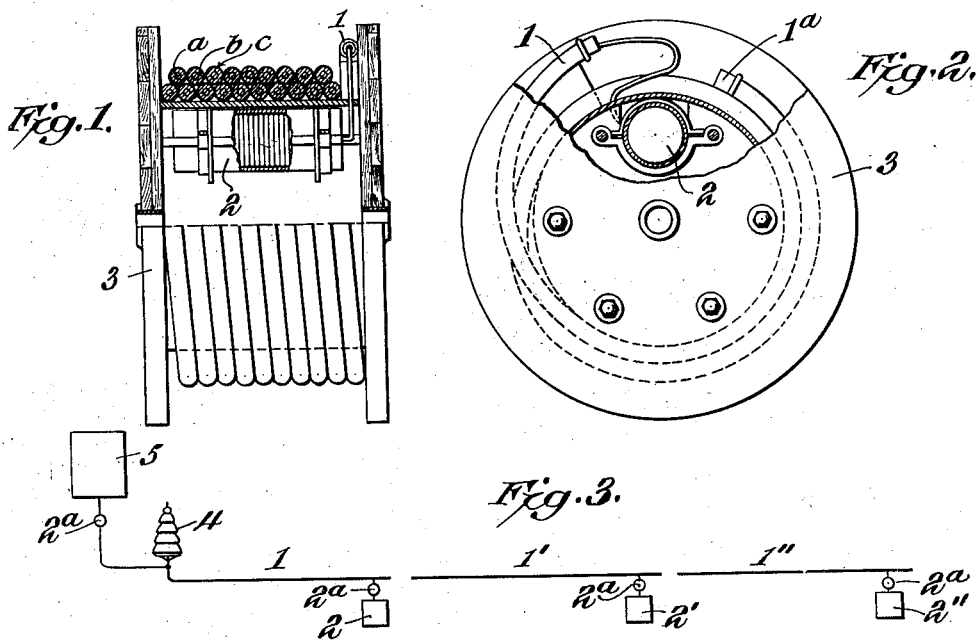
Inventor
Luigi Emanueli,
By Emil Bonnelycke
Attorney Patented May 25, 1937

2,081,880

UNITED STATES PATENT OFFICE 2,081,880

HIGH TENSION ELECTRIC CABLE

Luigi Emanueli, Milan, Italy, assignor to Società Italiana Pirelli, Milan, Italy Application May 22, 1929, Serial No. 365,111
In Great Britain January 20, 1928

11 Claims. (Cl. 173—266)

The present application is a substitute for and continuation in part of my prior application Serial No. 319,100, filed November 13, 1928.

This invention relates to high tension electric cables of the type provided in their interior with a longitudinal cavity or cavities filled with oil or fluid insulating compound under pressure, and has for its object to effect improvements in the condition under which the cable lengths are kept from the time of leaving the factory, during transport, and until they have been laid, and also in the procedure of laying and jointing the cable lengths. The cavities in the cables of the type in question may be located between the factory insulation surrounding the core (or cores in the case of multicore cables) and the lead sheath, or in the interior of the conductor (or conductors in the case of multicore cables) or in the thickness of the insulation, or in the spaces between the insulated cores in the case of multicore cables; and in order to maintain such cavities always filled with the oil or fluid insulating compound under the various conditions to which the cable may be subjected the cavities are preferably placed in connection at predetermined distances along the cable with automatically operating feeding reservoirs or compensators containing oil or fluid insulating compound such as described for example in the prior English Patents Nos. 255,034 and 267,059.

With the oil-filled cables of the type above referred to, the lengths of cable, after they had been laid, could not be jointed with the cable already filled with oil, since the oil would flow out from the ends to be jointed, thus rendering impossible the operation of soldering the socket connecting the conductors of the adjacent cable ends. This necessitated the jointing being done with the cable empty of oil and the impregnation being effected afterwards, so that the cable had to be evacuated and finally reimpregnated with the insulating oil or compound in situ after it had been laid, an operation involving the use of vacuum pumps and moreover one which is very long, cumbersome and costly.

Another difficulty which has been experienced with the cables of the kind in question is that, if the cable lengths are sent out from the factory already filled with oil or other fluid insulating compound, the temperature of the cable may be lower during transportation than the temperature maintained when the cable ends were sealed in the factory. The contraction of the impregnating compound which then results from such a decrease of temperature diminishes the pressure in the cable and creates a vacuum, and if a small leak should occur at any point, as for example in the temporary caps which are wiped on to the cable sheath at the ends during transport, air and, it may be, water may be sucked in and the cable spoilt.

The present invention has for its object to overcome the various difficulties above referred to and in particular to enable the installation of cables of the kind referred to be effected without their having to be subjected to a vacuum process in situ and then reimpregnated. For this purpose, according to the present invention, there is connected with each length or section of impregnated cable sent out from the factory a reservoir capable of maintaining the length or section of cable to which it is attached completely impregnated with oil or fluid insulating compound at a greater pressure than that of the atmosphere notwithstanding the variation of the surrounding temperature to which the cable may be subjected; means being provided for controlling the flow of the oil. In this way the cable section is fed with oil from the reservoir when its temperature falls so that the desired pressure within the cable is maintained. The reservoir may conveniently comprise a variable-capacity reservoir of, for example, either of the types described in specification of English Patent No. 255,034, the dimensions of the reservoir being of course merely those required for the particular length of the cable in question and the variations of temperature to which it is liable to be subjected.

The cable is laid, in the impregnated condition and already filled with oil, each length or section of impregnated cable as sent out from the factory being connected with a reservoir as above described, whilst to avoid any trouble from flowing oil during the operation of jointing the cable, the two conductors of the adjacent cable ends to be joined are, according to a further feature of the invention, connected together mechanically without soldering them. The jointing operation is then completed in the ordinary way by the application of layers of insulating material to the jointed conductors and the application of a protective casing. During these operations the oil, which flows from the adjacent ends of the two cable lengths and which serves to impregnate and completely fill the joint, is provided by the reservoirs attached to the two lengths of cable, and the quantity of oil contained in the cable remains unchanged.

The procedure above described serves both for single-conductor cables and for cables with more than one conductor and, furthermore, can be applied to every type of cable with internal longitudinal channels, whether these be situated in the conductors or in the thickness of the insulation, or between the insulation and the lead sheath, or in the spaces between the cores of cables with more than one conductor. It is desirable, however, by means of any practicable convenient methods (binding, plugging, etc.) to limit somewhat the flow of oil from the adjacent ends of the two cable lengths until the conductors of the cable are completely jointed by means of the sockets and until the application of the layers of insulating material is about to be commenced, because the flow, even if it is not a hindrance during the application of the sockets, might in some cases exhaust the amount of oil in the reservoirs.

The jointing procedure according to the present invention can be adopted with all kinds of joints, that is, with paper or fibre insulation, formed by tapes or rolls, and wrapped by hand or by machine, and also with the stop-joint type of joint, in which the oil contained in one section of the cable cannot flow into the adjacent section so that the continuity of the oil is broken between the two lengths of cable which are joined.

The described procedure is applicable also to the terminals of the cable, making, also in this case, the connections without soldering by means of a socket pressed tightly on the conductors.

In order that the said invention may be clearly understood and readily carried into effect, the same will now be described more fully, for example, in the particular case of a single-core cable with the cavity in the conductor, with reference to the accompanying drawing, in which:

Figures 1 and 2 illustrate diagrammatically in part-sectional elevation and side view respectively the shipping drum carrying a length of cable and its attached reservoir.

Figure 3 is a diagrammatic view of three lengths of cable already laid but not yet connected with one another.

The cable, a length of which is illustrated in Figures 1 and 2, comprises a hollow stranded conductor $a$ over which is wound fibrous insulation $b$, such as paper for example, and surrounding the insulation is a lead sheath or enclosure $c$.

To one end 1 of the length of cable there is attached a small variable-capacity reservoir 2 comprising an outer casing and a plurality of cellular elements located therein, the walls of which are free to move in response to changes of fluid pressure. The other end of said cable length is provided with the usual temporary cap 1a, the cable and its attached reservoir being conveniently arranged on a shipping drum 3 as by coiling to form a helix.

The lengths of cable 1, 1', 1'', when removed from the drums (see Figure 3), are laid already filled with oil, each length being connected with its respective small feeding or compensating reservoir 2, 2', 2'', which has kept it completely impregnated after leaving the factory and during transit. The connections between these reservoirs and the cable lengths may be equipped with small valves 2a to control the oil flow. The reservoir connected to each cable length is kept attached thereto whilst laying each length during the installation of the cable, thereby keeping the cable perfectly saturated with oil or other insulating compound and under a pressure greater than that of the surrounding atmosphere also, from the time when it is laid in the desired position until the jointing operations can be started. When the terminal 4 connected to a suitably elevated large feeding tank 5 filled with oil or other fluid insulating compound is attached to the end of cable section 1, the small reservoir 2 attached to the other end of this section can be removed and the jointing effected between cable sections 1 and 1'. During the operation of jointing, a flow of oil through the cable lengths 1 and 1' is maintained by the reservoirs 5 and 2', the oil which leaks out from the cable ends during the jointing operation at the point where the joint is made ensuring that no air can enter the cable, so that no further impregnation thereof is necessary. After sections 1 and 1' have been jointed, the small reservoir 2' can be removed and the jointing effected between sections 1' and 1'', the flow of oil therethrough during the jointing being maintained by the reservoirs 5 and 2'', and so on for all the various lengths of cable to be connected. If the capacity of the small reservoir, as attached to each length of cable when sent out from the factory, is not considered sufficient to ensure a flow of oil through the cable length in question during the time required in the formation of the joint with the adjacent cable length, a larger reservoir may be substituted.

The joint itself may be impregnated with or without a vacuum treatment. The former method ensures a somewhat better result and may be carried out by using a pump which removes the air present in the joint in a time shorter than that taken by the oil, coming from the cable, to fill it. The flow of oil may be controlled by suitable restrictors fitted in the reservoirs or compensators connected to the various cable lengths.

As previously mentioned the joints may be either of the usual type used in ordinary cables or of the stop-joint type, which latter are so designed that the oil contained in one section of the cable cannot flow into the adjacent section. The construction of this latter type of joint can be varied considerably as to many of its details, some instances of joints of this kind being described for example in the specifications of English Patents Nos. 255,033 and 268,271. A stop-joint may limit both a section of cable with no ordinary joint inserted or a section of cable in which one or more ordinary joints are inserted. A section of cable the ends of which are so limited by two stop-joints can be fed during service by reservoirs as described in the specification of English Patent No. 251,670. The amount of oil required in the feeding reservoirs or tanks is determined by factors involving the construction of the cable and by the temperature of the ground or other place in which the cable is laid at the moment when the operation of filling the reservoirs is carried out. In the case where the type of reservoir used is that in which the oil surrounds the flexible-walled cells filled with gas, as described for example in the specification of the English Patents Nos. 255,034 and 267,059 hereinbefore referred to, the pressure in the said reservoir must be adjusted accordingly.

No claim is made herein to the details of my improved joint itself, or the method of making the same, this subject matter being reserved for my divisional application, Serial No. 531,788, filed April 21, 1931.

Having now particularly described and ascertained the nature of said invention and in what manner the same is to be performed, I declare that what I claim is:

1. A method of maintaining high tension electric cables of the kind referred to completely impregnated with oil or fluid insulating compound from the time they leave the factory until permanently installed in the site required, characterized by providing each length of impregnated cable with a reservoir serving to positively maintain the length of cable completely impregnated with the oil or compound at a pressure greater than that of the atmosphere at all times notwithstanding the variation of the surrounding temperature to which the cable may be subjected.

2. A method of maintaining a length of metal-covered high tension electric cable completely impregnated with fluid insulation prior to installation, which comprises sealing the ends of the covering to make them fluid tight, connecting a variable-capacity reservoir containing insulating fluid to the interior of the covering and maintaining the fluid within the reservoir and covering at a pressure which is at all times above that of the medium surrounding the said length of cable.

3. A high tension electric cable of the character described in which there is connected with each length of cable during its transit from the factory to the site where it is to be used a variable-capacity reservoir serving to maintain the length of cable completely impregnated with oil or compound at a pressure greater than that of the atmosphere at all times notwithstanding the variation of the surrounding temperature to which the cable may be subjected.

4. In combination, a carrier comprising end heads, a barrel portion located between the heads, a sheathed electric cable containing fluid insulation which is wound on the outside of the barrel, one end of said cable being sealed, and a variable-capacity reservoir which is connected to the opposite end of the cable into and from which the fluid of the cable is free to flow, said reservoir being located within the barrel portion of the carrier.

5. In combination, a reel comprising end heads and barrel portion, a sheathed electric cable containing fluid insulation under pressure, which is wound on the outside of the barrel to form a helix, one end of the cable being sealed, a fluid containing reservoir located within the barrel and extending axially thereof, means within the reservoir which yield in response to changes of fluid pressure within the cable, and a conduit which connects the interior of the reservoir with the other end of the cable and through which fluid is free to flow between the two.

6. As an article of manufacture, a unitary length of cable adapted to be installed in a cable system comprising an insulated conductor, a longitudinal channel for fluid insulation, an hermetically sealed enclosure therefor, and a fluid containing reservoir temporarily connected to the interior of the enclosure which serves to maintain the insulation of the length of cable completely impregnated with fluid at a positive pressure which is at all times greater than that of the atmosphere external to the sheath.

7. As an article of manufacture, a length of cable coiled to form a helix and comprising a conductor, impregnated insulation therefor, a longitudinal channel which supplies fluid to the insulation, a metallic fluid-tight sheath which completely encloses the conductor and its associated parts, and a small sealed reservoir which is temporarily connected to the interior of the sheath and contains fluid maintained at a pressure above that of the atmosphere to ensure at all times prior to installation of the cable impregnation of the insulation by the fluid irrespective of temperature changes external to the sheath.

8. A length of cable adapted to be installed as a part of a complete cable comprising a conductor covered with fibrous insulation and having a longitudinal fluid containing channel, a sheath which surrounds the insulation and is temporarily sealed at one end, a reservoir which is temporarily connected to the other end and contains expansible means movable in response to changes of fluid pressure within the sheath, and a body of fluid in the channel and reservoir, said reservoir maintaining the channel filled with fluid under positive pressure at all times and the insulation impregnated with fluid irrespective of the changes of external temperature to which the length of cable may be subjected.

9. A carrier, a length of cable coiled on the carrier to form a helix, said cable comprising a conductor covered with fibrous insulation, an enclosing sheath, a longitudinally extending fluid containing channel within the sheath, a means for temporarily closing one end of the sheath, and a sealed reservoir supported by the carrier and connected to the other end of the sheath to supply fluid to the channel as the external temperature falls and to receive fluid therefrom as the temperature rises.

10. A cable having a longitudinal duct for supplying insulating liquid to the dielectric throughout the cable, said duct being filled with insulating liquid and said cable being wound on a drum for shipment or storage, and means for maintaining the duct full of insulating liquid under pressure during shipment and storage, said means comprising a reservoir containing insulating liquid under pressure and connected to the end of the cable and subjecting the liquid in the duct to a continuous pressure above atmospheric, said reservoir being expansible and contractible for taking up and paying out insulating liquid as the cable undergoes thermal changes.

11. In combination, a shipping carrier comprising end heads, a barrel portion located between the heads, a sheathed electric cable containing a longitudinal oil duct filled with fluid insulation under pressure above atmospheric pressure, said cable being wound on the outside of the barrel, one end of said cable being sealed, and a variable capacity reservoir which is connected to the duct at the opposite end of the cable and into and from which the fluid of the cable is free to flow, said reservoir being located within the barrel portion of the carrier and being always under pressure above atmospheric pressure to maintain a positive pressure on the fluid in the duct during shipment and storage of the cable.

LUIGI EMANUELI.